United States Patent
Kolb

(10) Patent No.: US 6,315,259 B1
(45) Date of Patent: Nov. 13, 2001

(54) ARTICULATING ARM FOR MAINTAINING THE ORIENTATION OF A REMOTE MEMBER

(76) Inventor: Timmothy B. Kolb, 349 Paine St., South Elgin, IL (US) 60177

( * ) Notice: Subject to any disclaimer, the term of this patent is extended or adjusted under 35 U.S.C. 154(b) by 0 days.

(21) Appl. No.: 09/584,058

(22) Filed: May 30, 2000

(51) Int. Cl.$^7$ ................................................. E04G 3/00
(52) U.S. Cl. .................................. 248/276.1; 248/278.1; 403/113
(58) Field of Search .............................. 248/276.1, 278.1, 248/282.1, 292.14, 918; 403/113, 116, 61

(56) References Cited

U.S. PATENT DOCUMENTS

| | | | |
|---|---|---|---|
| 153,943 | * | 8/1874 | Gray .................................. 248/276.1 |
| 599,706 | * | 3/1898 | Heineken .......................... 248/278.1 |
| 858,821 | | 7/1907 | Oliver .............................. 248/123.11 |
| 1,070,524 | | 8/1913 | Pieper ............................. 248/281.11 |
| 3,662,981 | * | 5/1972 | Hogrebe .......................... 248/278.1 |
| 3,680,448 | | 8/1972 | Ballingall ........................ 52/169.12 |
| 3,883,105 | | 5/1975 | Matsumoto ..................... 248/281.11 |
| 4,127,341 | | 11/1978 | Stevens .................................. 403/113 |
| 4,447,031 | | 5/1984 | Souder, Jr. ..................... 248/281.11 |
| 4,453,695 | * | 6/1984 | Sennott et al. ......................... 248/660 |
| 4,560,129 | | 12/1985 | Clayton ............................. 248/278.1 |
| 4,590,695 | * | 5/1986 | McGillivary ........................ 38/102.2 |
| 4,846,434 | * | 7/1989 | Krogsrud .......................... 248/284.1 |
| 4,950,100 | | 8/1990 | Horgas ................................ 403/113 |
| 5,277,427 | | 1/1994 | Bryan ................................... 473/232 |
| 5,348,260 | | 9/1994 | Acevedo ......................... 248/280.11 |
| 5,743,503 | | 4/1998 | Voeller .............................. 248/284.1 |
| 6,030,130 | * | 2/2000 | Paddock et al. ..................... 396/421 |
| 6,179,262 | * | 1/2001 | Ellard et al. ...................... 248/276.1 |

* cited by examiner

Primary Examiner—Anita King
Assistant Examiner—Holly N. Sy
(74) Attorney, Agent, or Firm—Robert L. Marsh

(57) ABSTRACT

An articulating arm for moving a first member with respect to a second member while maintaining the first member in the desired orientation with respect to the second member has first and second connectors and first and second arm members. The first arm member is tubular in shape with rectangular cross section, and the second arm member moves within the central opening of the first arm member. The ends of the first arm member are pivotally connected by pins to the first and second connectors and the ends of the second arm member are similarly connected by pins to the first and second connectors with the pins defining a parallelogram for maintaining the orientation of the second member with respect to the first. The first arm member has arcuate slots at the ends thereof to accommodate the pins which extend through the first and second connector members and the second arm member such that the second arm member can move with respect to the first arm member.

2 Claims, 3 Drawing Sheets

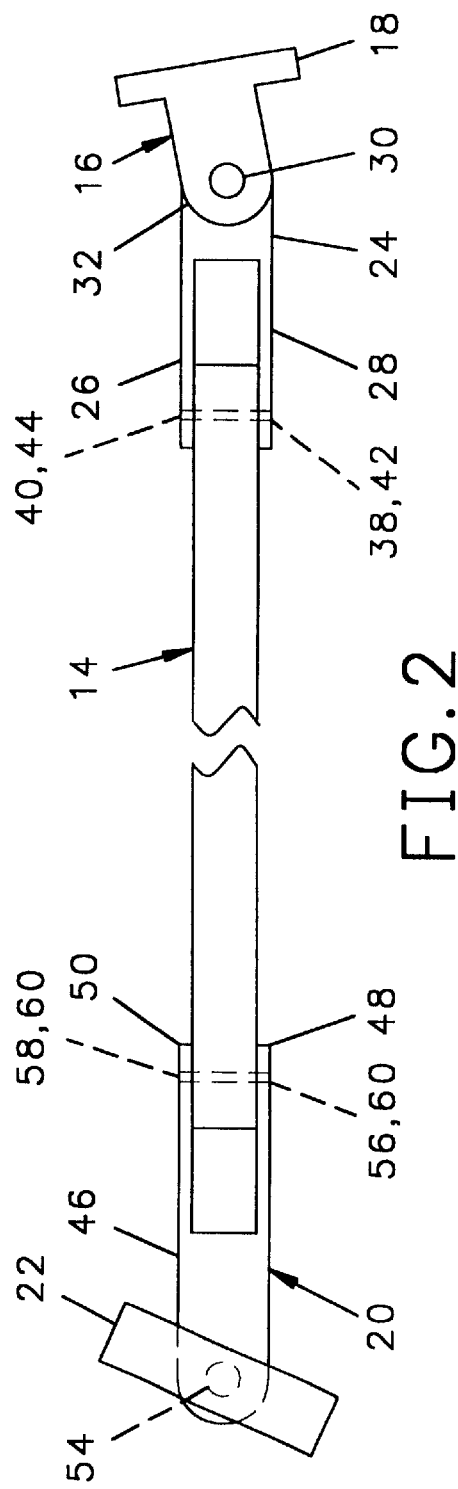
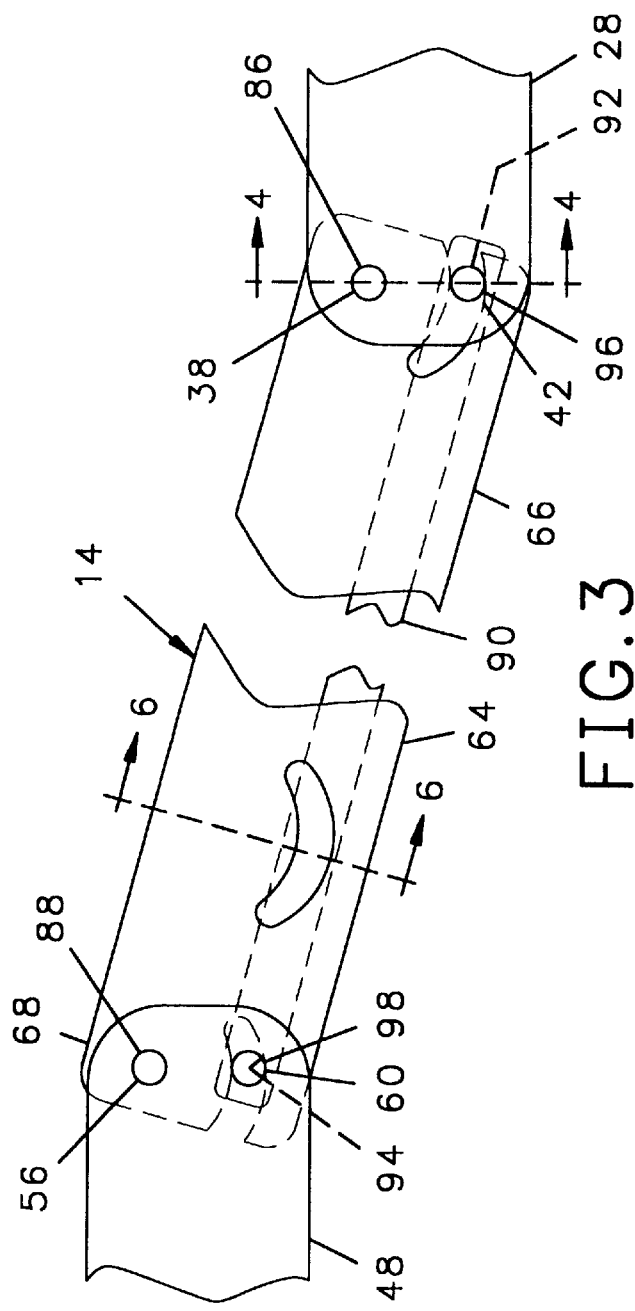
FIG. 2
FIG. 3

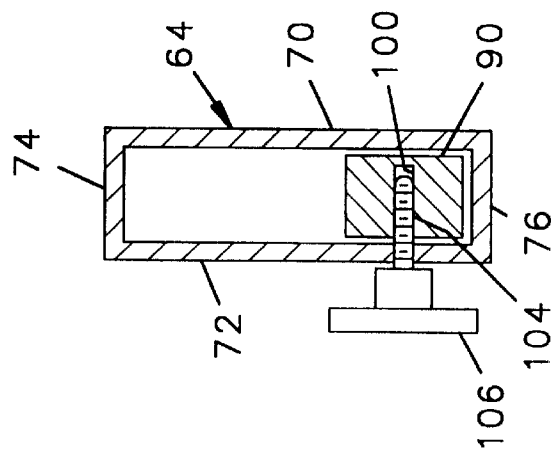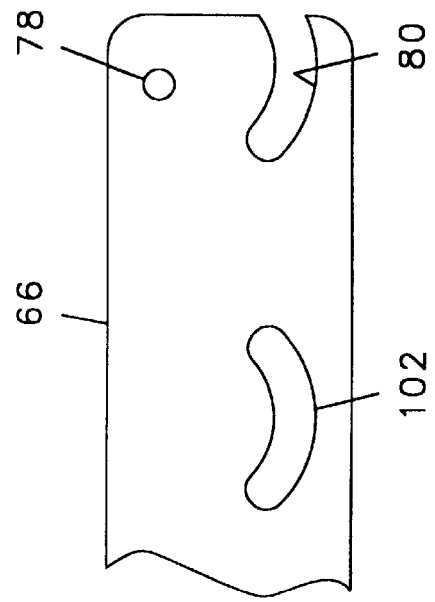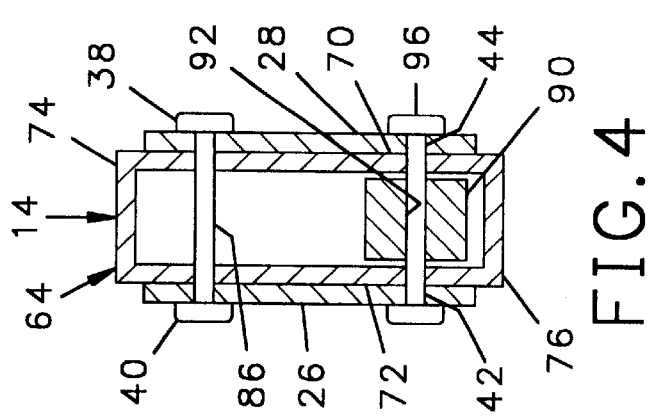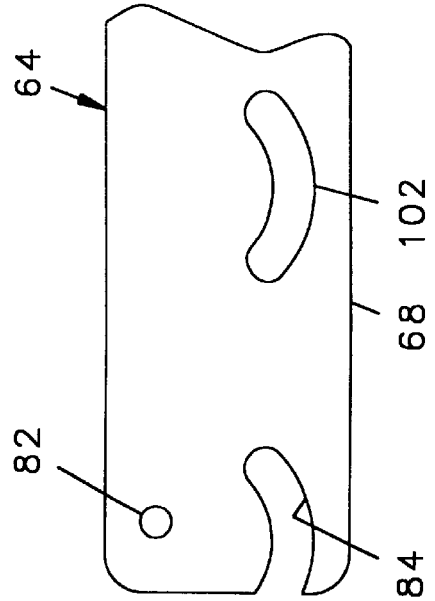

US 6,315,259 B1

ARTICULATING ARM FOR MAINTAINING THE ORIENTATION OF A REMOTE MEMBER

FIELD OF THE INVENTION

The present invention relates to articulating arms for moveably connecting a first body to a second body while maintaining the orientation of the first body with respect to the second body during movement.

BACKGROUND OF THE INVENTION

Articulating arms which extend between a first body member and a second body member whereby the orientation of the second body is maintained with respect to the first are well known in the art. One usage for such arms is to maintain the orientation of a moveable remote input/output station attached to a machine. An x-ray machine, for example, may have an output screen for providing information to the operator who must see the screen from a remote position where he or she is shielded from the effects of the rays. The orientation of the screen, therefore, must be maintained while it is moved both horizontally and vertically to a position where it can be viewed without being obstructed by other pieces of equipment in the room.

The arm has first and second attachment portions for attachment to the first and second body members, and first and second parallel arms extending between the first attachment member and the second attachment member. To maximize the aesthetic appearance, the first arm may be structured as a tubular member with the second arm moveable within the first arm. Such a structure is disclosed by Horgas, U.S. Pat. No. 4,950,100 issued Aug. 21, 1990.

The Horgas articulating arm provides the desired moveability of a first member with respect to a second member, however the Horgas arm is not available for all uses. It would, therefore, be desirable to provide an articulating arm for maintaining the orientation of a first member with respect to a second member while allowing horizontal and vertical movement of the first member with respect to the second member and for providing an aesthetic appearance for uses where the Horgas arm is not available.

SUMMARY OF THE INVENTION

Briefly, the present invention is embodied in an articulating arm for maintaining the orientation of a first body with respect to a second body while allowing movement of the first body with respect to the second body. The arm includes a first connector for connecting to the first body, the first connector having a first central body portion and first and second spaced parallel plates extending from the central body portion with first and second pairs of aligned holes extending through the spaced parallel plates of the first connector. A second connector is provided for connecting to the second body, and the second connector has a second central body portion with first and second parallel spaced plates extending from the central portion and first and second pairs of aligned holes extending through the parallel plates of the second connector.

The arm further includes a first arm member having a first end and a second end with transverse holes in each of the ends. The first end of the first arm member is positioned between the parallel plates of the first connector and a pin extends through the first pair of aligned holes and the transverse hole of the first end of the first arm member. Similarly, the second end of the first arm member extends between the parallel plates of a second connector and is retained therein by a pin extending through the first pair of aligned holes thereof and the transverse hole of the second end of the first arm member. A second arm member also has a first end and a second end with transverse holes at each of the ends. Like the first arm member, the second arm member is positioned between the parallel plates of the first connector and is retained therein by a pin extending through the second pair of aligned holes and the transverse hole in the first end of the second arm member while the second end thereof is retained between the parallel plates of the second connector by a pin through the second pair of aligned holes and the transverse hole in the second end of the second arm member.

In accordance with the invention, the first arm member is tubular having a rectangular cross sectional exterior shape, and a rectangular cross sectional shape to the central opening therein. The second arm member is moveable within the first arm member, and the first arm member has an arcuate slot at each of the ends thereof through which extend the pins connecting the ends of the second arm member to the first and second connectors.

BRIEF DESCRIPTION OF THE DRAWINGS

A better understanding of the present invention will be had after a reading of the following detailed description taken in conjunction with the drawings wherein:

FIG. 2 is a top elevational view with concealed portions thereof shown in broken lines of articulating arm shown in FIG. 1 with the output screen removed and the arm disconnected from the machine;

FIG. 3 is a fragmentary enlarged front elevational view of the articulating arm shown in FIG. 1 with portions of the interior shown in broken lines;

FIG. 4 is a further enlarged cross sectional view of the arm shown in FIG. 3 taken through line 4—4 thereof;

FIG. 5 is an e elevational view of the first arm member of the articulating arm shown in FIG. 3; and FIG. 6 is an enlarged cross sectional view similar to FIG. 4 taken through line 6—6 of FIG. 3.

DETAILED DESCRIPTION OF THE PREFERRED EMBODIMENT

Figure 1:
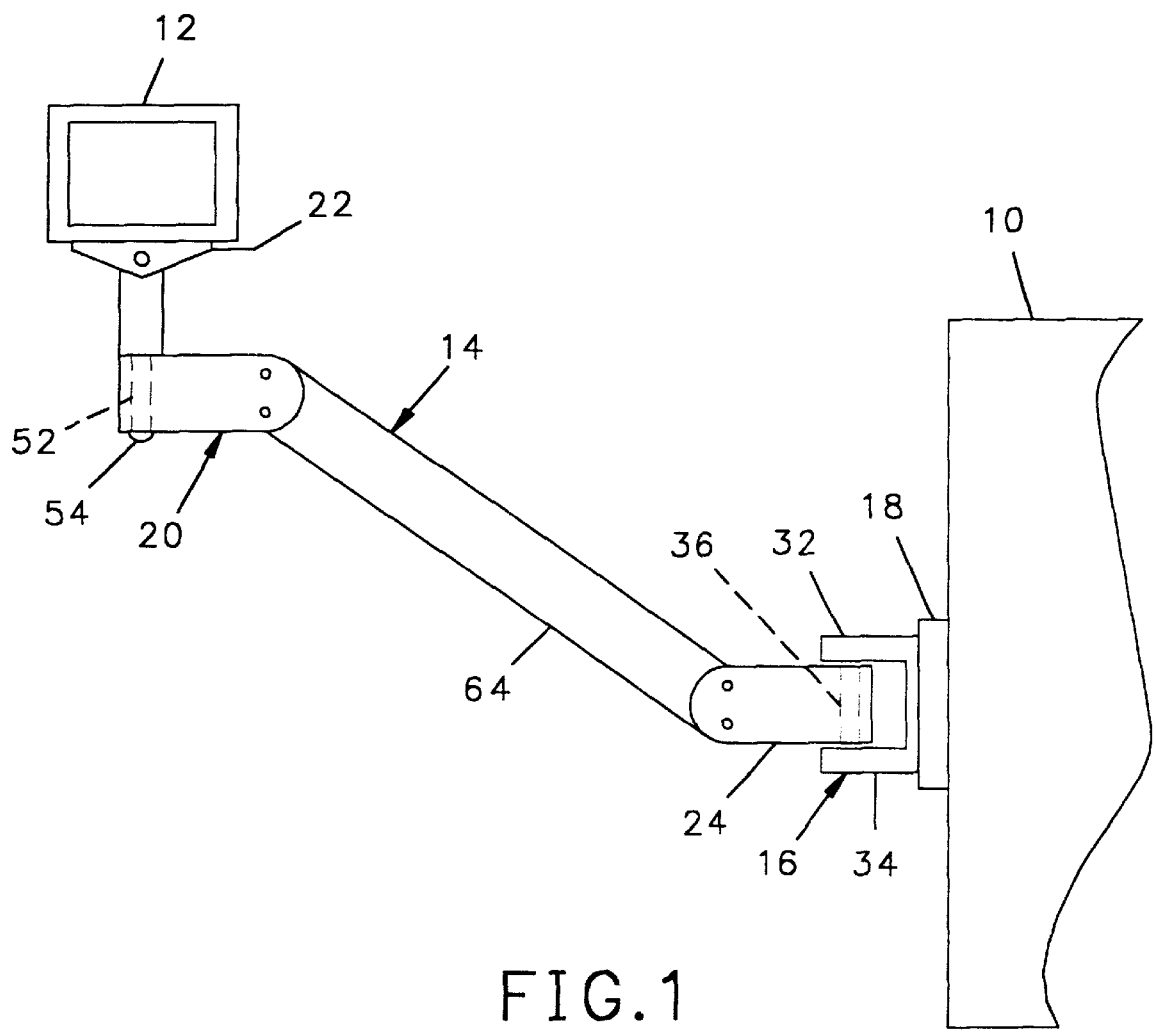
FIG. 1 is a front elevational view of an articulating arm having one end connected to a machine and the second end supporting an output screen.

Referring to FIGS. 1, 2 and 4, a machine 10, such as an x-ray machine, has an output which is displayed on a video screen 12, that must be maintained in a vertical orientation with respect to the machine 10. To maintain the vertical orientation of the screen 12, an articulating arm 14 is provided. The articulating arm 14 has a first connector 16 having an attachment plate 18 for attachment by a plurality of screws, not shown, to a vertical surface of the machine 10 and a second connector 20 with a horizontal mounting plate 22 to which the display screen 12 is attached.

The first connector 16 has a central body portion 24 from which extend parallel spaced plates 26, 28. A vertically oriented pin 30 extends through upper and lower eyes 32, 34 extending from the attachment plate 18 and through an aperture 36 in the central body portion 24 of the first connector 16 to permit rotation of the arm 14 about the pin 30. Also, a first pair of aligned holes 38, 40 extend through the upper portion of the first and second plates 26, 28 respectively and a second pair of aligned holes 42, 44 extend through the bottom portion of the parallel plates 26, 28 respectively.

Referring to FIGS. 1, 2, 3 and 5, the second connector 20 has a central body portion 46 from which extend first and second parallel spaced plates 48, 50 and a vertically oriented transverse hole 52 receives a pin 54 extending downwardly from the horizontal attachment plate 22. The attachment plate 22 has suitable mounting holes, not shown, through screws, not shown, extend to retain the screen 12 thereto.

Extending through the upper portion of the parallel spaced mounting plates 48, 50 are a first pair of aligned holes 56, 58 respectively and extending through the lower portion of the parallel spaced plates 48, 50 are a second pair of aligned holes 60, 62.

Referring to FIGS. 3, 4, 5 and 6, the articulating arm 14 has a first arm member 64 having a first end 66 and a second end 68. The first arm member 64 has a rectangular cross section with spaced side portions 70, 72 and upper and lower end portions 74, 76 respectively leaving a rectangular central opening defined by the inner surfaces of the portions 70, 72, 74, 76.

When the first arm member 64 is positioned horizontally as shown in FIG. 5, extending through the upper section of both side portions 70, 72 of the first end 66 is a transverse hole 78, and below the transverse hole 78 is an arcuate slot 80. Similarly, extending through the upper section of both side portions 70, 72 of the second end 68 is a second transverse hole 82 below which is a second arcuate slot 84.

As best shown in FIG. 3 and 4, the first end 66 of the arm member 64 is positioned between the parallel plates 26, 28 of the first connector 16 and is retained therein by a first pin 86 extending through the aligned holes 38, 40 thereof and through the hole 78 at the first end of the first arm 64. Similarly, the second end 68 of the first arm member 64 is positioned between the parallel plates 48, 50 of the second connector 20 and is retained therein by a second pin 88 extending through the first pair of parallel holes 56, 58 in the plates 48, 50 respectively and through the upper hole 82 at the second end of first arm member 64. The arm member 64 therefore spaces the first pair of parallel holes 38, 40 of the first connector plate a fixed distance from the first pair of parallel holes 56, 58 of the second connector member.

Referring to FIGS. 3 to 6 extending through the central opening of the first arm member 64 is a second arm member 90 having a first transverse hole 92 at one end thereof and a second transverse hole 94 at the opposite end thereof, and the distance between the holes 92, 94 of the second arm 90 are equal to the distance between the holes 78, 82 of the first arm member 64. A pin 96 extends through the second pair of aligned holes 42, 44 of the spaced plates 26, 28 of the first connector 16 and through the first hole 92 of the second arm 90 and a second pin 98 extends through the second aligned holes 60, 62 of the parallel spaced plates 48, 50 of the second connector 20 and through the hole 94 of the second arm 90. As can be seen, the arcuate slot 80 at the first end 66 of the arm 64 permits movement of the first arm 64 with respect to pin 96 while maintaining an aesthetic appearance in which the rectangular body of the arm 64 extends between the parallel plates 26, 28 of the first connector 16. Similarly, the second arcuate slot 84 permits movement of the first arm member 64 with respect to pin 98 and provides for an aesthetic appearance in which the rectangular body of the first arm member 64 extends continuously between the parallel plates 56, 58 of the second connector 20.

To lock the articulating arm 14 in a desired orientation, the second arm member 90 has at least one threaded hole 100 oriented parallel to the transverse holes 92, 94 thereof and the first arm member 64 has at least one arcuate window 102.

A stud 104 has a handle 106 at one end and threads at the other end thereof has the threaded end extended through the arcuate window 102 and into the hole 100 of the second arm 90 such that tightening the stud 104 with the handle 106 locks the second arm 90 with respect to the first arm 64.

As can be seen, there has therefore been disclosed an articulating arm 14 attachable to a machine 12 for retaining a second member such as the screen 12. The screen 12 mounted on the plate 22 can be rotated about the pin 30 so as to the visible in any direction. The screen 12 can be moved upwardly or downwardly while maintaining the screen 12 in a vertical orientation because the pins 86, 88, 96, 98 define the four corners of a parallelogram with the pins defining parallel vertical lines at each of the connectors 16, 20. The arm 14 is also moveable about the pin 30 of the first connector for rotation of the arm 14 about the machine 10.

While the present invention has been described with respect to a single embodiment, it will be appreciated that many modifications and variations may be made without departing from the true spirit and scope of the invention. Therefore, it is intended by the appended claims to cover all such modifications and variations which come within the true spirit and scope of the invention.

What is claimed:

1. An articulating arm for maintaining the orientation of a first body with respect to a second body while allowing movement of said first body with respect to said second body, said arm comprising:

a first connector for connecting to said first body, said first connector having a central portion and first and second spaced parallel plates extending from said central portion, said spaced parallel plates of said first connector having first and second pairs of spaced holes extending therethrough, a second connector for connecting to said second body, said second connector having a central portion and first and second spaced parallel plates extending from said central portion, said spaced parallel plates of said second connector having first and second pairs of spaced holes extending therethrough, a first arm having a first end and a second end, said first arm having parallel side portions, each of said side portions having a first end and a second end, said first ends of said side portions of said first arm each having a transverse hole therein and an arcuate slot therein, said second ends of said side portions of said first arm each having a transverse hole therein and an arcuate slot therein, said first ends of said side portions positioned between said spaced parallel plates of said first connector and retained by a pin through said transverse holes in said first ends of said side portions and said spaced holes in said spaced parallel plates of said first connector, said second ends of said side portions positioned between said spaced parallel plates of said second connector and retained by a pin through said transverse holes in said second ends of said side portions and said spaced holes in said spaced parallel plates of said second connector, a second arm having a first end and a second end, and transverse holes with one through each of said first end and said second end thereof, a pin extending through said spaced parallel plates of said first connector and said transverse hole at said first end of said second arm and within said slots in said first end of said side portions of said first arm, and a pin extending through said spaced parallel plates of said second connector and said transverse hole at said second end of said second arm and within said slots in said second end of said side portions of said first arm.

2. The articulating arm of claim 1 further comprising said second arm having a threaded bore therein, an arcuate window in one of said side portions of said first arm, and a threaded stud extending through said arcuate window and into said threaded bore.

* * * * *

UNITED STATES PATENT AND TRADEMARK OFFICE
CERTIFICATE OF CORRECTION

PATENT NO. : 6,315,259 B1
DATED : November 13, 2001
INVENTOR(S) : Timothy B. Kolb It is certified that error appears in the above-identified patent and that said Letters Patent is hereby corrected as shown below:

<u>Title page,</u>
Correct the spelling of the inventors name to read: -- Timothy B. Kolb --

Signed and Sealed this

Twenty-first Day of May, 2002

Attest:

*Attesting Officer*

JAMES E. ROGAN
*Director of the United States Patent and Trademark Office*